United States Patent
Abdallah et al.

(10) Patent No.: US 10,626,963 B2
(45) Date of Patent: Apr. 21, 2020

(54) ARTICULATED MECHANISM FOR LINEAR COMPLIANCE

(71) Applicants: GM GLOBAL TECHNOLOGY OPERATIONS LLC, Detroit, MI (US); Université Laval, Quebec (CA)

(72) Inventors: Muhammad E. Abdallah, Rochester Hills, MI (US); Clément Gosselin, Quebec (CA); Thierry Laliberte, Quebec (CA); Simon Foucault, Quebec (CA); Pascal Labrecque, Quebec (CA); James W. Wells, Rochester Hills, MI (US)

(73) Assignees: GM Global Technology Operations LLC, Detroit, MI (US); Université Laval, Quebec (CA)

( * ) Notice: Subject to any disclaimer, the term of this patent is extended or adjusted under 35 U.S.C. 154(b) by 294 days.

(21) Appl. No.: 15/284,043

(22) Filed: Oct. 3, 2016

(65) Prior Publication Data
US 2017/0108098 A1    Apr. 20, 2017

Related U.S. Application Data

(60) Provisional application No. 62/243,455, filed on Oct. 19, 2015.

(51) Int. Cl.
*B25J 17/00*     (2006.01)
*F16H 21/54*     (2006.01)
(Continued)

(52) U.S. Cl.
CPC ............ *F16H 21/54* (2013.01); *B25J 9/0048* (2013.01); *B25J 9/1065* (2013.01); *B25J 17/00* (2013.01); *B25J 17/0208* (2013.01); *F16H 21/06* (2013.01)

(58) Field of Classification Search
CPC ........ F16H 21/54; F16H 21/06; B25J 9/0048; B25J 9/1065; B25J 17/00; B25J 17/0208;
(Continued)

(56) References Cited

U.S. PATENT DOCUMENTS 2,198,635 A * 4/1940 Rossman ................ F16H 21/04
                                                              74/103
3,865,340 A * 2/1975 Ellis ........................ B23Q 1/50
                                                              248/421

(Continued)

FOREIGN PATENT DOCUMENTS

CN          201073767 Y     6/2008
CN          102292194 A    12/2011
(Continued)

OTHER PUBLICATIONS

A.B. Kempe, B.A., How to Draw a Straight Line; a Lecture on Linkages, Jan. 16, 1877, p. 11 of the lecture (p. 25 of the PDF) Year: 1877).*

(Continued)

*Primary Examiner* — Jake Cook
*Assistant Examiner* — Gregory Robert Weber
(74) *Attorney, Agent, or Firm* — Quinn IP Law

(57) ABSTRACT

An articulated compliance mechanism for use with a support structure includes a carriage and a pair of parallel four-bar linkage arrangements. The arrangements collectively have a first set of links configured to rigidly connect to the support structure, a second set of links rotatably coupled to the carriage a distance from the first set of links, and a third set of links rotatably coupled to and spanning the distance. The compliance mechanism supports and provides the carriage, e.g., a rectangular shaped frame, with a stable equilibrium point using a gravitational restoring force, and provides the carriage with a passive translational degree of freedom along (Continued)

a horizontal axis in response to an input force from an operator. An additional compliance mechanism may be serially connected to provide a passive translational degree of freedom along a vertical axis. A system includes the compliance mechanism and support structure.

6 Claims, 7 Drawing Sheets

(51) Int. Cl.
   *B25J 17/02* (2006.01)
   *B25J 9/10* (2006.01)
   *B25J 9/00* (2006.01)
   *F16H 21/06* (2006.01)

(58) Field of Classification Search
   CPC .... B25J 17/0225; B25J 17/0233; B25J 17/02; B25J 9/1055; B25J 13/088
   USPC ......... 74/490.01; 212/312, 326, 327; 901/45
   See application file for complete search history.

(56) References Cited

U.S. PATENT DOCUMENTS

| | | | |
|---|---|---|---|
| 5,179,525 A | | 1/1993 | Griffis et al. |
| 5,440,943 A | * | 8/1995 | Holt ................ B25J 9/1694 248/277.1 |
| 5,485,763 A | * | 1/1996 | Pincus ................ A47C 3/02 248/370 |
| 5,499,320 A | | 3/1996 | Backes et al. |
| 5,529,159 A | * | 6/1996 | Troccaz ............ B25J 19/0004 192/21 |
| 6,729,202 B2 | | 5/2004 | Gosselin et al. |
| 7,992,733 B2 | | 8/2011 | Laliberte et al. |
| 8,181,799 B2 | | 5/2012 | Laliberte et al. |
| 8,601,897 B2 | * | 12/2013 | Lauzier ............ B25J 17/0208 74/490.01 |
| 8,985,354 B2 | | 3/2015 | Lecours et al. |
| 9,235,214 B2 | * | 1/2016 | Anderson ............ G05D 1/0221 |
| 9,359,176 B2 | | 6/2016 | Gao et al. |
| 9,630,815 B2 | | 4/2017 | Gao et al. |
| 9,784,347 B2 | * | 10/2017 | Martyn .................. F16H 21/04 |
| 9,895,798 B2 | | 2/2018 | Helmer |
| 10,407,183 B2 | | 9/2019 | Potters et al. |
| 2009/0075793 A1 | * | 3/2009 | Trainor ............. A63B 21/0087 482/112 |
| 2013/0112641 A1 | | 5/2013 | Laliberte et al. |
| 2013/0112644 A1 | * | 5/2013 | Gao ........................ B66C 17/00 212/312 |
| 2013/0248477 A1 | * | 9/2013 | Gao ........................ B66C 13/08 212/312 |
| 2013/0319401 A1 | * | 12/2013 | Capan .................. F24S 30/425 126/600 |
| 2017/0013778 A1 | * | 1/2017 | Borry ................... A01D 41/145 |
| 2017/0183202 A1 | | 6/2017 | Gao et al. |

FOREIGN PATENT DOCUMENTS

| | | | | |
|---|---|---|---|---|
| CN | 103496633 A | | 1/2014 | |
| CN | 103640022 A | | 3/2014 | |
| CN | 103919591 A | | 7/2014 | |
| CN | 104622573 A | | 5/2015 | |
| CN | 104781050 A | | 7/2015 | |
| DE | 1184167 B | * | 12/1964 | ............. F16H 21/04 |
| DE | 102015009362 A1 | * | 1/2017 | ............. B25J 9/026 |
| EP | 0595291 A1 | | 5/1994 | |
| JP | 2009033974 A | * | 2/2009 | |
| WO | 9950721 A1 | | 10/1999 | |
| WO | 2014018983 A1 | | 1/2014 | |

OTHER PUBLICATIONS

Shiriaev, Freidovich, Gusev; "Transverse Linearization for Controlled Mechanical Systems With Several Passive Degrees of Freedom"; IEEE Transactions on Automactic Control, Apr. 2010; pp. 893-906; vol. 55, No. 4.

* cited by examiner

ARTICULATED MECHANISM FOR LINEAR COMPLIANCE

CROSS-REFERENCE TO RELATED APPLICATIONS

This application claims the benefit of U.S. Provisional Application No. 62/243,455, filed Oct. 19, 2015, which is hereby incorporated by reference in its entirety.

INTRODUCTION

The present disclosure relates to an articulated mechanism assisting a human and/or machine operator in acting on a static load while performing manual or automated work tasks such as positioning or moving a payload or tool. Machines used for manufacturing and assembly are designed to control component movement and positioning. Such control is achieved in response to electronic control signals, e.g., from a human-machine or machine-machine interface of an automation system. Automation systems may also include structure that helps support the weight of the payload.

SUMMARY

An articulated compliance mechanism and system are disclosed herein for physical interaction with an operator, i.e., a human and/or a machine. The articulated compliance mechanism may be used to assist the operator in moving or otherwise acting on a static load presented or supported by a carriage forming the final/end link of the articulated compliance mechanism. A payload, work tool, or other object may be connected to the carriage via an end-effector, and therefore the magnitude of the static load as contemplated herein could range from the carriage alone to the carriage, end-effector, and any additional load supported by the end-effector. The mechanism and system are configured to reduce static friction ("stiction") of the type that may be experienced in moving or acting on such a static load, and to thus provide a desired amount of linear/translational compliance.

As used herein, the term "compliance" refers to a degree of displacement caused in response to an applied input force, such that increased compliance results in greater displacement for the same amount of input force. The term "linear compliance mechanism" as used herein thus provides a highly-compliant translational degree of freedom (DOF), i.e., a DOF in which a relatively large linear displacement results from a relatively low applied input force. In this manner, the operator's perceived effort is reduced when the operator moves or otherwise acts on the static load. Translation may be linear or quasi-linear in spite of any rotation of links of the articulated compliance mechanism. In other words, translation is provided purely with rotation of the compliance mechanism without use of, e.g., sliders or other linear devices.

The system includes the articulated compliance mechanism and, in certain embodiments, a support structure such as an overhead trolley or a robot. The articulated compliance mechanism, which may be coupled to the support structure and to the static load, provides the system with one or more linear/translational control degrees of freedom (DOF) along a given horizontal and/or vertical axis of a multi-axis reference frame, e.g., an example XYZ Cartesian frame. Different individual, serial, or combined embodiments provide the desired compliance and DOF to ensure desired yielding of the end-effector and any supported static load to an input force imparted by the operator or a machine. As described herein, the articulated compliance mechanism uses links and revolute/single-axis rotational joints to provide the described linear/translational DOF and stable equilibrium point.

The articulated compliance mechanism may include an end-effector. The support structure includes all control DOF of the system outside of the translational DOF provided by the articulated compliance mechanism including, if used, the end-effector. The term "end-effector" as used herein may be configured as a multi-fingered gripper, suction cups, a vice grip or clamp, or the like. The articulated compliance mechanism is statically-balanced such that a carriage and any connected end-effector remains in a particular equilibrium position when the load is released, with gravity being the restoring force returning the carriage to the equilibrium position for horizontal DOF embodiments and a spring force, e.g., from a coil spring, cylinder, or other resilient member providing a mechanical restoring force in vertical DOF embodiments. Rotational movement of the articulated compliance mechanism is thus transformed into quasi-linear travel of the articulated compliance mechanism and any connected static load along a translational DOF having such an equilibrium position. The compliance mechanism also restricts or prevents rotational motion of the end-effector and any supported static load, which may be desirable in some applications.

The support structure and/or the end-effector may have one or more actively-controlled ("active") DOF, which may be linear and/or rotational, that can be automatically controlled via an optional controller. The articulated compliance by way of contrast mechanism provides passive translational DOF in the various disclosed embodiments.

The articulated compliance mechanism may be optionally embodied as a parallelogram configuration, and/or may include upper and/or lower compliance mechanisms. In an embodiment, the upper compliance mechanism is configured for connection to the support mechanism. The lower compliance mechanism may be attachable to the upper compliance mechanism to ensure compliant movement of the static load with the one or two horizontal DOF and/or the one vertical DOF as noted above.

The articulated compliance mechanism in some embodiments includes a carriage and a pair of parallel four-bar linkage arrangements having a first set of links configured to rigidly connect to the support structure, a second set of links rotatably coupled to the carriage a distance apart from the first set of links, and a third set of links rotatably coupled to and spanning the distance between the first and second sets of links. The articulated compliance mechanism is configured to support and provide the carriage with a stable equilibrium point using a gravitational restoring force, and to provide the carriage with a passive translational degree of freedom along a first horizontal axis in response to an input force from an operator.

An additional articulated compliance mechanism such as a Sarrus linkage or a parallelogram linkage may be used to provide a passive/translational DOF along a vertical axis. For instance, the additional articulated compliance mechanism may include a top plate, a bottom plate, and first and second pairs of links connected therebetween. The first and second pairs of links rotate with respect to hinges or revolute joints, causing a distance between the top and bottom plates to increase and decrease based upon an arcuate motion of travel about the hinges.

Certain embodiments may utilize brakes and/or locking devices disposed at the various joints or joint limits and responsive to control signals from the optional controller. For instance, the system may include one or more range limit sensors configured to detect motion of a given link proximate a joint, and to communicate a range limit signal to the controller when the link or links move beyond a predetermined range limit. The controller, in response to the range limit signal, can selectively suppress operation of the support structure or any other mechanism of the system having active DOF, e.g., by arresting motion or cutting power via the brakes. Locking devices may also be engaged to prevent motion along any axis of the articulated compliance mechanism or the support structure as needed.

The above features and advantages, and other features and advantages of the present disclosure, will be readily apparent from the following detailed description of the embodiment(s) and best mode(s) for carrying out the disclosure when taken in connection with the accompanying drawings and appended claims.

DETAILED DESCRIPTION

Figure 1:
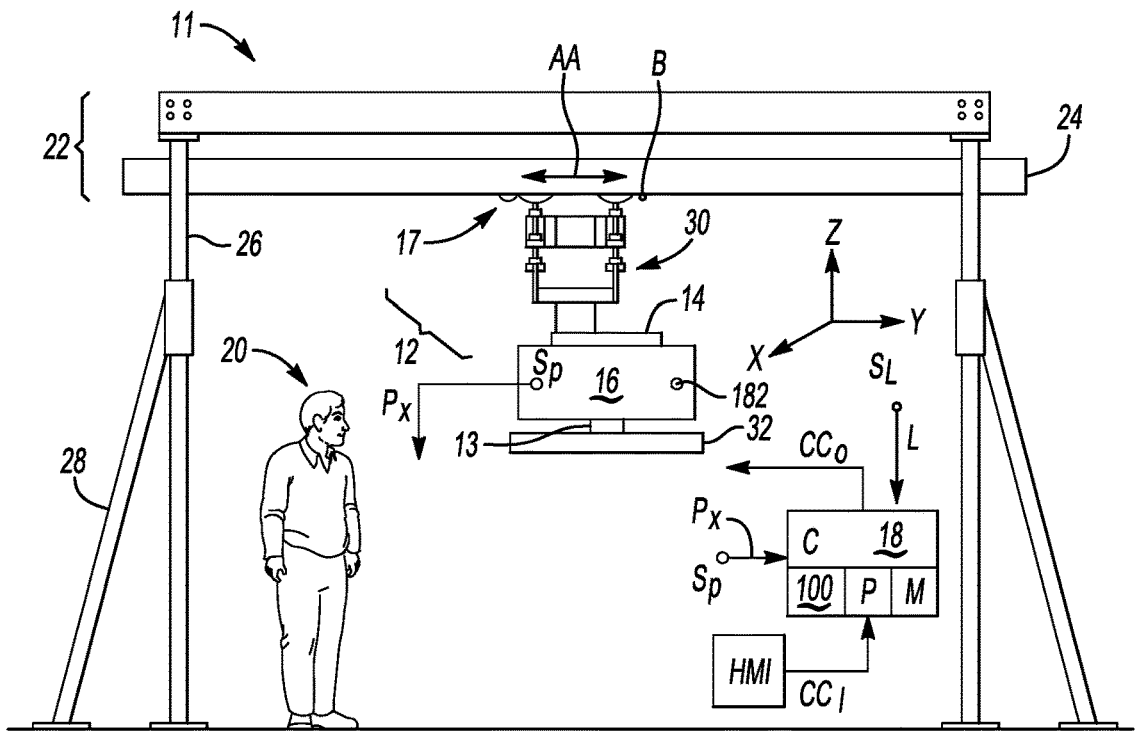
FIG. 1 is a schematic side view illustration of a system utilizing an articulated compliance mechanism in accordance with the present disclosure.

Reference will now be made in detail to several embodiments of the disclosure that are illustrated in the accompanying drawings. The same or similar reference numerals are used in the drawings and the description to refer to the same or like structure. The drawings are in simplified form and are not to scale. For purposes of convenience and clarity, directional terms such as top, bottom, left, right, up, over, above, below, beneath, rear, and front, may be used with respect to the drawings. These and similar to directional terms are not to be construed to limit the scope of the disclosure in any manner.

An example system 11 is shown in FIG. 1 that is configured to support and control the position of a static load 32, i.e., a payload, work tool, or other object having a known/ unchanging and thus static mass. The system 11 includes an articulated compliance mechanism 16 shown schematically as a box in FIGS. 1-1B for illustrative simplicity. The articulated compliance mechanism 16 provides one, two, or three linear/translational degrees of freedom (DOF) in different embodiments as set forth herein with reference to FIGS. 2-8, and may include an optional support structure 12 and controller (C) 18. The articulated compliance mechanism 16 may include or be connected to an end-effector 13 that is configured to couple to, secure, or otherwise support the static load 32.

The support structure 12 may be embodied as any positioning and support structure having multiple control DOF, some of which may be actively controlled/actuated ("active DOF") and some unactuated ("passive DOF"). In the example embodiment of FIG. 1, the support structure 12 includes a base assembly 14 and various suspension linkages 30 responsive to electronic control signals (arrow $CC_O$) from the controller 18. In other embodiments, such as that shown in FIG. 1B, the support structure 12 may include a multi-axis robot 60, e.g., a 6-axis industrial robot. Such a robot 60 may mounted to a support member 51 such as a pedestal, pillar, or beam, whether vertically-oriented as shown or suspended overhead, to enable the robot 60 to secure and position the articulated compliance mechanism. FIG. 1B also depicts a hand 20H of an operator 20 shown in FIGS. 1 and 1B as the operator 20 grasps a positioning handle 16H and moves the articulated compliance mechanism 16 and any static load 32 connected thereto, with the load 32 omitted from FIG. 1B for illustrative clarity. While a human operator 20 is depicted, the operator 20 as disclosed herein may be a machine, a robot, or a machine-assisted human operator in various embodiments. Thus, the term "operator" as used herein is not intended to be restricted to human operators.

Figure 1A:
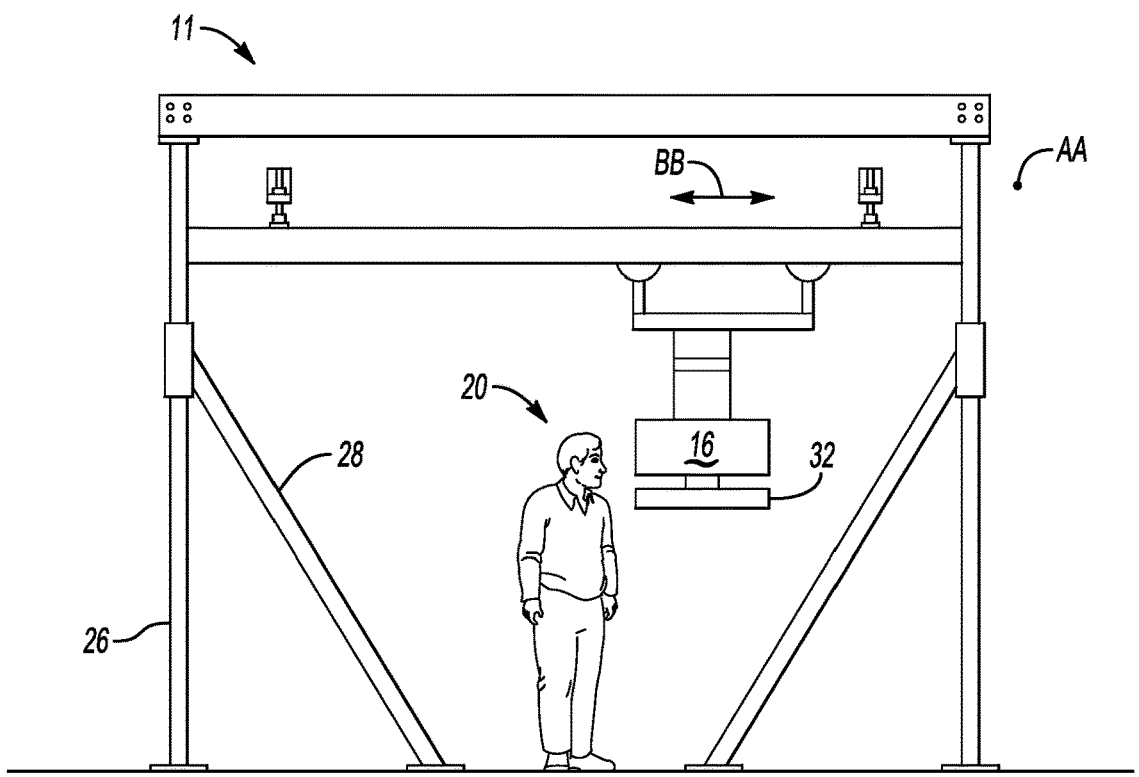
FIGS. 1A and 1B are additional schematic side view illustrations of the system shown in FIG. 1.
Figure 1B:
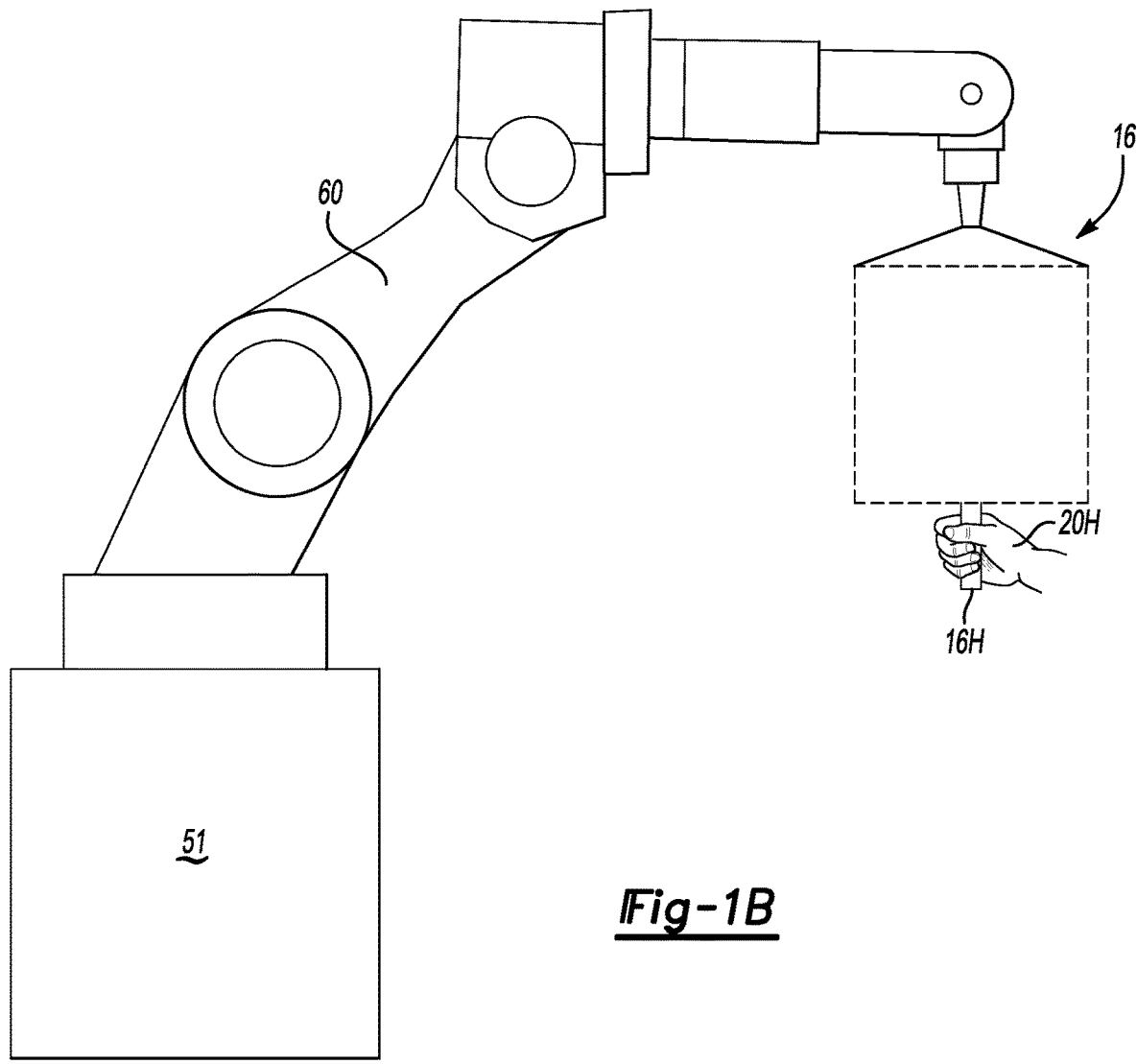

The articulated compliance mechanism 16 of FIGS. 1 and 1A is configured to reduce stiction and passively assist the operator 20 by reducing or eliminating targeted task loads in the completion of a given work task, as well to allow the operator 20 to manipulate the end-effector 13 in a three-dimensional space as represented in FIG. 1 by a Cartesian XYZ reference frame. By way of example, the articulated compliance mechanism 16 may be used in connection with a system defined by U.S. Provisional application Ser. No. 14/811,072, filed Jul. 28, 2015 titled "Low-Impedance Articulated Device and Method for Assisting a Manual Assembly Task," the entirety of which is hereby incorporated by reference.

In the example embodiment of FIGS. 1 and 1A, the support structure 12 may include optional overhead support beams 22 having an active/actuated linear positioning mechanism, e.g., a two linear DOF gantry or overhead bridge crane having drive wheels 17 forming a trolley with the suspension linkages 30, and possibly providing a rotational DOF. The support beams 22 may include one or more horizontal rails 24, vertical support beams 26, and angled support beams 28. The terms "horizontal" and "vertical" as used herein refer to a typical orientation with respect to the XYZ Cartesian reference frame, with the Z axis being the vertical axis orthogonal to the horizontal X and Y axes, and the X and Y axes being orthogonal with respect to each other. The vertical support beams 26 and the angled support beams 28 together support the weight of the horizontal rails 24 and any structure suspended therefrom, with the horizontal rails 24 positioned overhead with respect to the operator 20 in a standing position as shown. The drive wheels 17 may be actuated via motors, chains, belts, or the like (not shown) so that the articulated compliance mechanism 16 and any supported static load 32 translates along the horizontal rails 24 as indicated by double-headed arrow AA, or rotates as needed.

The same drive wheels 17 and suspension linkages 30 may, in some embodiments, translate orthogonally with respect to the horizontal rails 24 as shown via double-headed arrow BB in FIG. 1A. The two translational DOFs may be controlled by the controller 18 along with translational and rotational DOF of the optional base assembly 14 such that the base assembly 14 includes any structure providing the translational DOF of the example support structure 22. As noted above, the structure of FIGS. 1 and 1A is merely one possible configuration, with the robot 60 shown in FIG. 1B used to provide the same or additional translational and/or rotational DOF in other embodiments.

The controller 18 of FIGS. 1 and 1A may be embodied as a digital computer having a processor (P) and memory (M). The memory (M) includes sufficient amounts of tangible, non-transitory memory, e.g., read only memory, flash memory, optical and/or magnetic memory, electrically-programmable read only memory, and the like. Memory (M) also includes sufficient transient memory such as random access memory, electronic buffers. Hardware of the controller 18 may include a high-speed clock, analog-to-digital and digital-to-analog circuitry, and input/output circuitry and devices, as well as appropriate signal conditioning and buffer circuitry. The memory (M) may be programmed with computer-readable instructions 100 enabling the controller 18 to control any active joints, brakes B, and locking mechanisms 182 as needed, including to arrest motion of the support structure 12 or temporarily prevent movement along a given axis if needed. Encoders (not shown) may be positioned with the various joints if needed to report joint position or angle to the controller 18.

The controller 18 may also include an optional human machine interface (HMI) such as a touch screen to facilitate selection of different control modes of support structure 12. The HMI is programmed to allow the operator 20 to select a particular task, control mode, and associated control law as an input signal (arrow $CC_I$). For example, actuated joints of support structure 12 can be controlled in an autonomous mode where the joints perform pre-programmed tasks independent of the operator 20 in order to reduce the non-value added effort of the operator 20, e.g., to grossly position the device 16, end-effector 13, and static load 32.

As part of the overall control of the system 11, the controller 18 may receive position signals (arrow $P_X$) from a plurality of joint position sensors ($S_P$) positioned with respect to joint actuators (not shown) of joints of the system 11, i.e., any passive (non-actuated) joints or actively-controlled (actuated) joints. Additional joint position sensors ($S_P$) may be positioned with respect to, i.e., on, in, or in close proximity to, the articulated compliance mechanism 16. While two such joint position sensors ($S_P$) are shown for simplicity, any number of joint position sensors ($S_P$) may be used. In this manner, the controller 18 is able to use position feedback in the overall motion control of the system 11. Additional input signals (arrow $CC_I$) may be received by the controller 18 such as selections of a particular task and/or preferred control mode by the operator 20 via the HMI device.

Also, range limit signals (arrow L) may be sensed by one or more range limit sensors ($S_L$) disposed within the system 11, such as in close proximity to the various joint limits of the articulated compliance mechanism 16, the end-effector 13, and the support structure 12. The control signals (arrow $CC_O$) are transmitted by the controller 18 to the various joint actuators of the system 11, e.g., wireless or via low-voltage wires, in order to maintain desired relative positioning of the various active joints of the system 11 in the event such active joints are used.

When the articulated compliance mechanism 16 reaches a range limit of any of its joints, as detected by the range limit sensors ($S_L$) and reported to the controller 18 as the range limit signals (arrow L), the controller 18 may, as part of the control signals (arrow $CC_O$), command suppressing or arresting of motion of the support structure 12. For instance, the controller 18 may command an emergency stop (E-stop) of the support structure 12 by transmitting the control signals (arrow $CC_O$) to brake actuators or brakes (B) disposed at the various joints of the system 11, doing so in response to the range limit signals (arrow L). The range limit signals (arrow L) may contain dual channels for signal redundancy. Locking devices 182 may be positioned at a corresponding revolute joint of the compliance device 16 described below to temporarily prevent motion along a given axis if so desired.

Brakes (B) of the type known in the art may include solenoid devices or hydraulic clamps, friction brakes, magnetic brakes, or other mechanical or electrical interlocks. Such brake actuators may be independently engaged, i.e., without regard to the status of the range limit signals (arrow L). That is, the brakes (B) may be selectively engaged to restrict motion of the end-effector 13 and any connected static load 32 in a corresponding one of the degrees of freedom of the articulated compliance mechanism 16. While an example location for the brake actuator (B) is shown schematically in FIG. 1, those of ordinary skill in the art will recognize that all joints may be equipped with similar brake actuators (B) and automatically controlled such that individual active DOF can be selectively locked via the control signals (arrow $CC_O$). Likewise, the locking devices 182 may be clamps, pins, or other suitable interlocking mechanism. For a given compliance device 16, locking rotation about one joint is sufficient to prevent motion along a given axis/degree of freedom.

Figure 2:
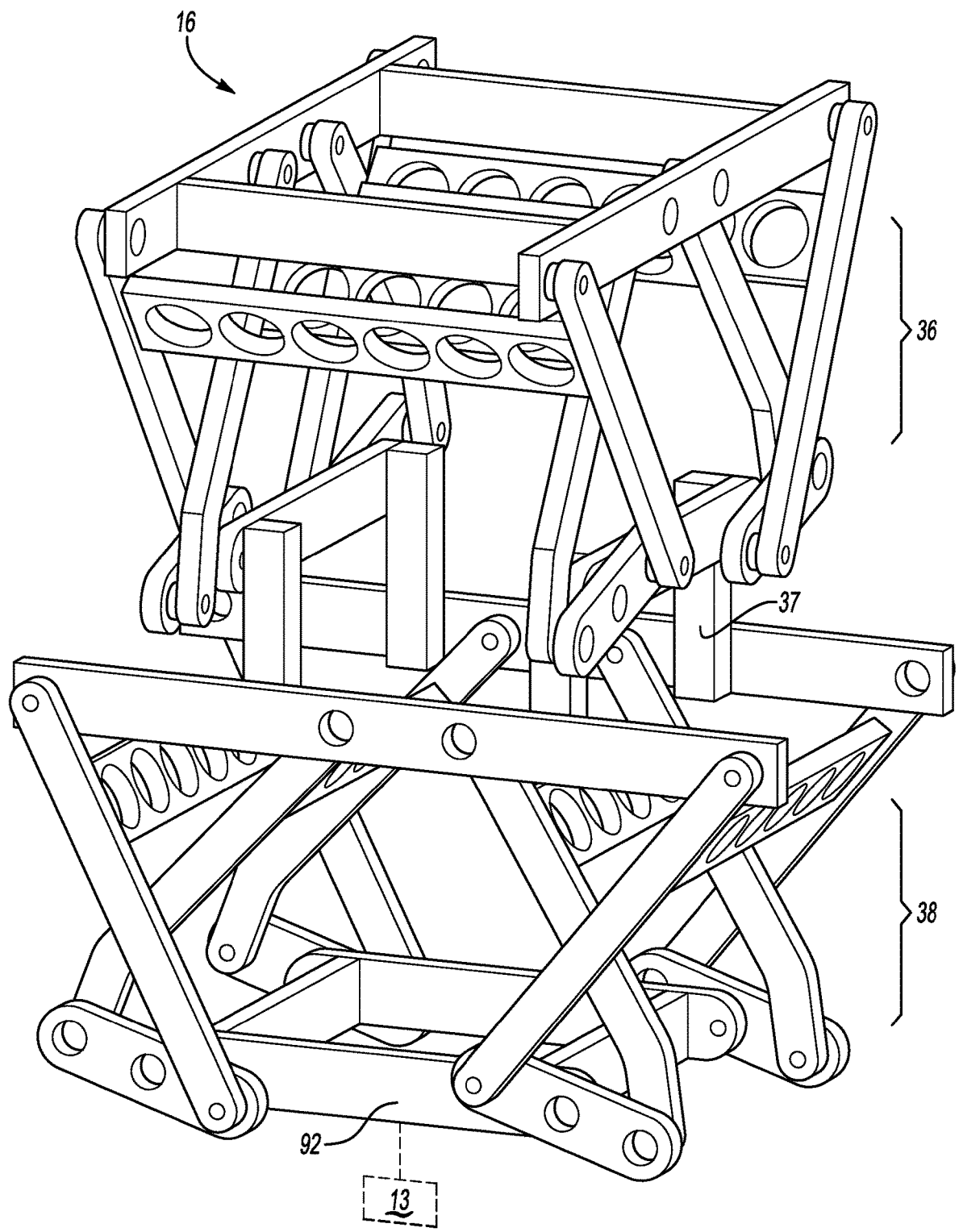
FIG. 2 is a perspective view illustration of an example articulated compliance mechanism in an embodiment providing two horizontal degrees of freedom (DOF).

As shown in FIG. 2, the articulated compliance mechanism 16 may be configured to provide one or two horizontal linear/translational DOF in the manipulation of the end-effector 13 and any other static load 32 of FIG. 1, i.e., to provide a passive translational DOF along the X and/or Y axes in the example Cartesian reference frame. The articulated compliance mechanism 16 in the non-limiting example embodiment of FIG. 2 includes an upper compliance mechanism 36 and a lower compliance mechanism 38, with "upper" and "lower" referring to the normal vertical orientation of the operator 20 of FIGS. 1 and 1A. When only one translational DOF is desired, the lower compliance mechanism 38 may be omitted. The upper compliance mechanism 36 may be coupled to the support structure 12 using any suitable attachment hardware, e.g., bolts, fasteners, or clamps. The lower compliance mechanism 38 may be mounted adjacent the upper compliance mechanism 36, e.g., via vertical rails 37 as shown. Links 46 of the upper compliance mechanism 36 are coaxially aligned and may be rigidly connected to the support structure 12, e.g., via bolting, clamping, or other suitable approaches, such that rotational motion of FIGS. 3A and 3B occurs while the orientation of links 46 remains fixed.

Each of the respective upper and lower compliance mechanisms 36 and 38 may be suspended from or otherwise supported from above, e.g., by the rails 24 (FIGS. 1 and 1A) or the robot 60 (FIG. 1B). In operation, the mechanisms 36 and/or 38 are configured to support a carriage 92, which may include at least one link 57, or a plurality of a plurality of links 57 rigidly coupled to each other and arranged in a predetermined geometric shape, e.g., a rectangle or square. The phrase "rigidly coupled" as used herein means that the carriage 92 moves as a whole unit, i.e., as a rigid box frame as shown. If the carriage 92 is connected the end-effector 13 and static load 32, with a stable equilibrium point, doing so using gravity as the restoring force, i.e., a gravitational restoring force. This is achieved by translating rotational movement of the linkage arrangements of the articulated compliance mechanism 16 into generally linear/quasi-linear travel using only the gravitational force, i.e., when the operator 20 releases the static load 32 of FIGS. 1 and 1A. The carriage 92 may be connected to the end-effector 13 of FIG. 1, for instance using clamps, bolts, fasteners, or any other suitable hardware.

Figure 3A:
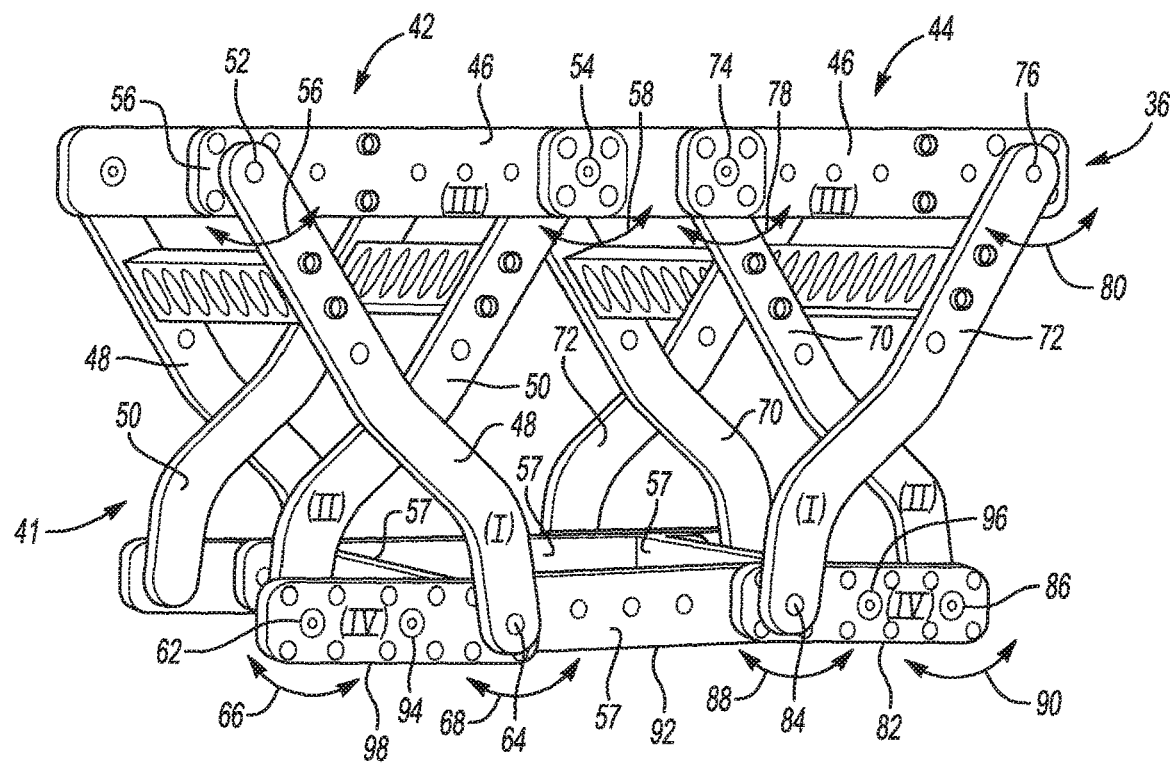
FIGS. 3A and 3B are perspective view illustrations of a portion of the articulated compliance mechanism shown in FIG. 2.
Figure 3B:
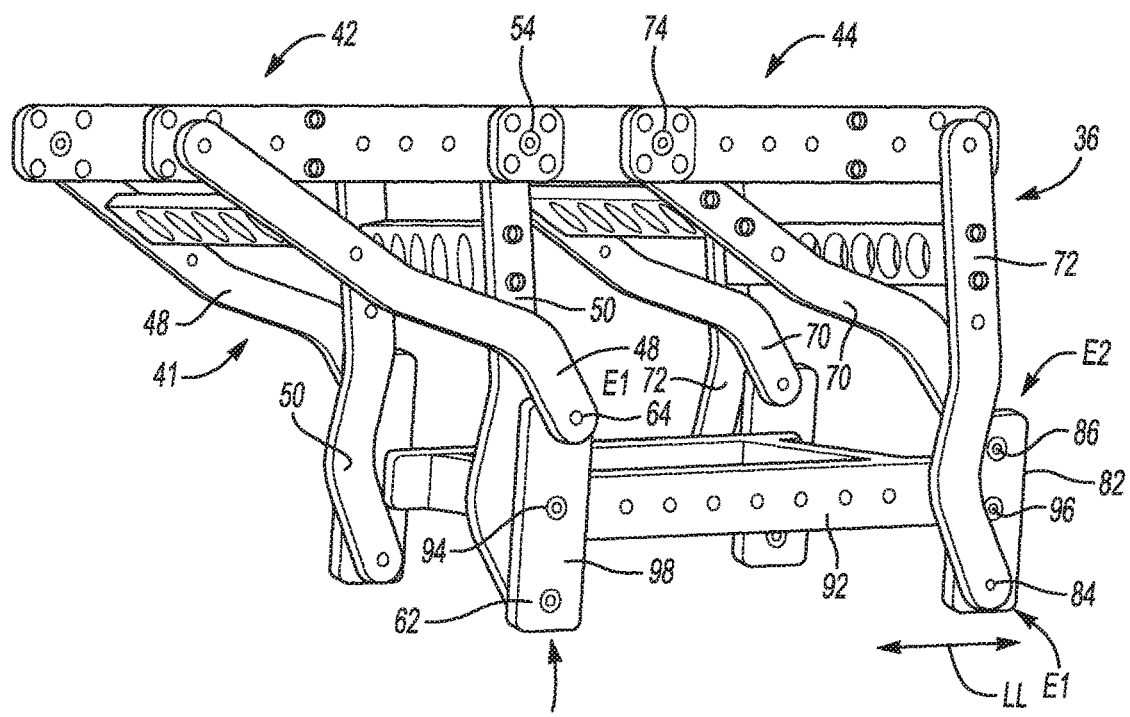

FIGS. 3A and 3B illustrate operation of the articulated compliance mechanism 16 of FIG. 2 with reference to the upper compliance mechanism 36. Operation of the lower compliance mechanism 38 is identical in configuration, each providing the same structure but oriented along a different horizontal axis. Therefore, the description of the upper compliance mechanism 36 applies to the lower compliance mechanism 38.

The upper compliance mechanism 36 may include a set of parallel four-bar linkage arrangements 41, the two lateral sides of which are symmetrical as shown, e.g., identical in some embodiments, and rotate in parallel planes. Such arrangements provide translation of rotational movement of the end-effector 13 to generally linear travel, e.g., a flat arc that is within about 5-10 degrees of true horizontal. It is understood that a variety of parallel four-bar linkages 41 may be used to accomplish the objectives of the disclosure. For example, the set of parallel four-bar linkages 41 may incorporate a modified Chebyshev linkage design. In other non-limiting embodiments of the disclosure, a Hoeckens linkage or a Chebyshev's Lambda linkage may be used to convert rotational motion to generally straight-line motion or linear travel and accomplish the objectives of the disclosure. The straight-line motion is modified in the disclosure to become a quasi-linear motion that consists of a portion of a circular arc whose center is located far above the carriage 92. This helps yield the center equilibrium position described herein.

The set of parallel four-bar linkage arrangements 41 may be embodied as first and second sets of parallel four-bar linkage arrangements 42 and 44 as shown in FIGS. 3A-3B. Linkage arrangements 42 and 44 may include an upper link 46 that may be a common element between the linkage arrangements 41. However, it is understood that distinct upper links 46 may be used in each of the respective sets of linkage arrangements 42 and 44 to accomplish the objectives of the disclosure. Although not depicted in FIGS. 3A and 3B, the upper link 46 may be configured for securement to an adjacent compliance mechanism 16 or rigidly connected to the support structure 12 of FIG. 1.

The set of four-bar linkage arrangements 42 may include first and second links 48 and 50 spanning a distance between the upper link(s) 46 and lower links 82, 98. Each link 48, 50 is adjustably connected to the upper link 46 at respective revolute joints 52 and 54. For purposes of clarity, each of the first and second links 48 and 50 extend generally downward from the upper link 46 toward the lower links 82, 98. The revolute joints 52 and 54 cooperate with the respective first and second links 48 and 50 such that each link 48 and 50 may rotate about an axis extending through the corresponding revolute joint 52 or 54, as indicated by arrows 56 and 58. Lower ends of the first and second links 48, 50 are adjustably connected to the lower link 98 by revolute joints 62 and 64. The upper link 46, first and second links 48 and 50, and lower link 98, once interconnected, create the links of the first set of parallel four-bar linkage arrangements 42. The links 48 and 50 may rotate about an axis extending through the respective revolute joints 62 and 64 as shown by arrows 66 and 68.

The second set of parallel four-bar linkage arrangements 44 may be positioned adjacent to and cooperate with arrangements 42. Each of the arrangements 44, like arrangement(s) 42, generally includes respective first (I) and second (II) links 72 and 70. The respective first and second links 72 and 70 are adjustably connected to the upper or third (III) link 46 by revolute joints 74 and 76. Joints 74 and 76 allow for rotational movement as indicated by arrows 78 and 80 of the respective first and second links 72 and 70, which occurs about a revolute axis extending through the joints 74 and 76. Lower ends of links 70 and 72 are connected to a lower/fourth (IV) link 82 by revolute joints 84 and 86 such that the links 70 and 72 can rotate about axes extending through the revolute joints 84 and 86, as shown by arrows 88 and 90, respectively. As shown in FIGS. 3A and 3B, the respective first and second links 48 and 50 of arrangement 42 cross each other and span a distance separating the respective third and fourth links 46 and 98. Similarly, the respective first and second links 72 and 70 of arrangement 44 cross each other and span the distance separating the respective third and fourth links 46 and 82.

In a non-limiting embodiment, the carriage 92 may be adjustably connected to the lower links 82 and 98 of the respective first and second linkage arrangements 42, 44 by joints 94, 96. The carriage 92 may be configured to receive and releasably secure the end-effector 13 shown schematically in FIG. 1. The carriage 92 may be rectangular in shape and extend substantially parallel to the upper link(s) 46.

In FIG. 3B, the parallel four-bar linkage arrangements 42 and 44 are shown in a translated position relative to the position of FIG. 3A. In the translated position, the respective first links 48 and 72 and second links 50 and 70 of the respective first and second linkage arrangement 42 and 44 rotate about joints 52, 54, 74, and 76. The lower (fourth) links 82 and 98 have respective ends E1 and E2, with the first links 48 and 72 rotatably coupled to the first end E1 of the lower links 98 and 82, respectively, and the second links 50 and 70 rotatably coupled to the second end E2 of the respective lower links 98 and 82, as shown in FIGS. 3A and 3B. The lower (fourth) links 82 and 98 of the respective first and second linkage arrangements 42 and 44 rotate in response to the rotational movement of the links of the linkage arrangements 42, 44. In response to this rotational movement of the lower links 82 and 98, the carriage 92 translates along a generally linear path represented by double-headed arrow LL, while maintaining the horizontal orientation shown in FIGS. 3A and 3B, thereby ensuring the desired compliance of the load 32 of FIG. 1, which although omitted from FIG. 3B is attached to the carriage 92.

Following translation, the carriage 92 of the articulated compliance mechanism 16 of FIG. 3B, and in particular the end-effector 13 and any connected static load 32, returns to a stable equilibrium point position shown in FIG. 3A using gravity as a restoring force, i.e., a gravitational restoring force. That is, a Chebyshev mechanism as modified herein to have a circular motion with a large radius, in combination with the gravitational force, provides a sufficient restoring force to urge the rotational movement to a static equilibrium point. Arrangement of linkages in the articulated compliance mechanism 16 of FIGS. 2-3B allows for nearly linear compliance using gravity while significantly reducing the stiction forces commonly associated with traditional linear guides. For purposes of clarity, the revolute axes extending through the various revolute joints of the first and second linkage arrangements 42 and 44 may each extend generally horizontally and laterally and generally parallel to each other in this arrangement.

Each articulated compliance mechanism 16 as described above controls linear/translational motion along a single horizontal axis of movement or DOF. The upper compliance mechanism 36 of FIGS. 2-3B. may be optionally secured adjacent to the vertical support beams 26 of the support structure 12 shown in FIG. 1, or to the robot 60 of FIG. 1B, and the lower compliance mechanism 38 may be secured to a portion of the upper compliance mechanism 36, e.g., via the rails 37 shown in FIG. 2. The upper compliance mechanism 36 provides equilibrium standardization and controls linear motion in a direction or DOF, in this case, the Y axis, while the lower compliance mechanism 38 provides equilibrium standardization and controls linear motion in a different axis of movement or DOF, in this case, the X axis. Each of the upper and lower compliance mechanisms 36 and 38 may be embodied as first and second sets of parallel four-bar linkages as shown.

As such, the upper compliance mechanism 36 remains in a stable equilibrium position as the lower compliance mechanism 38 adjusts the position of the end-effector 13/static load 32 secured on the carriage 92 along a controlled, linear, or generally linear path along the X axis. When relative position within the system 11 is adjusted, the upper compliance mechanism 36 stabilizes and controls movement of the end-effector 13/static load 32 in the Y axis of movement while the lower compliance mechanism 38 ensures stable movement of the end-effector 13/static load 32 along the X axis, or vice versa if the orientations are reversed.

The use of a double sets of parallel four-bar linkage arrangements 41 for each of the upper and lower compliance mechanisms 36 and 38, in combination with the stacking of the upper and lower compliance mechanisms 36, 38, ensures a compact compliance mechanism 16 with a stable equilibrium point using gravity as a restoring force, as noted above. In another embodiment of the disclosure, the controller 18 may transmit a stop signal to stop movement of the articulated compliance mechanism 16, thereby causing each of the upper and lower compliance mechanisms 36, 38 to cease travel and return to an equilibrium position to stop travel of the load 32.

Figure 7:
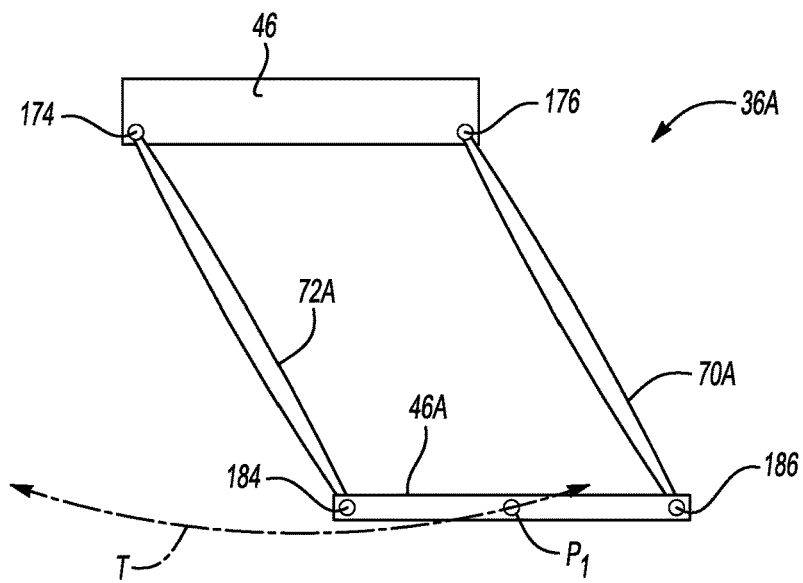
FIG. 7 is a schematic side view illustration of an optional parallelogram embodiment of the articulated compliance mechanism shown in FIGS. 2-3B.

Referring briefly to FIG. 7, the configuration of FIGS. 3A-B may be simplified and embodied as a basic parallelogram arrangement 36A. In such an embodiment, the upper link 46 may be disposed parallel to a lower link 46A, with links 70A and 72A being rotatably connected to the upper link 46 at revolute joints 176 and 174, respectively. Similarly, lower link 46A is rotatably connected to the links 70A and 72A at joints 186 and 184, respectively. Motion of the lower link 46A, to which the end-effector 13 of FIG. 1 may be attached, thus results in quasi-linear translation of the end-effector 13, as represented by the flat trajectory (T) of a center point $P_1$ of the lower link 46A. While only one set of links 70A, 72A is shown in FIG. 7, for added support a parallel set of links 70A, 72A may be used to form a box-type arrangement in a manner similar to that depicted in FIGS. 3A-B.

Figure 4A:
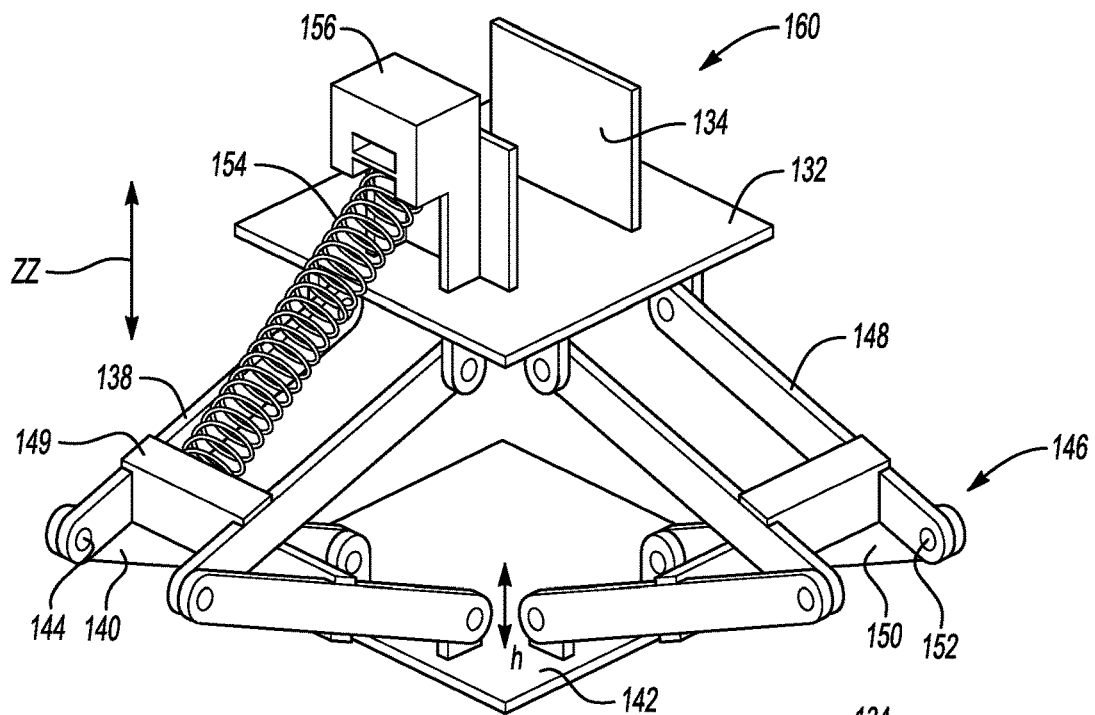
FIGS. 4A-4B are perspective view illustrations of an articulated compliance mechanism in an embodiment providing one vertical DOF.
Figure 4B:
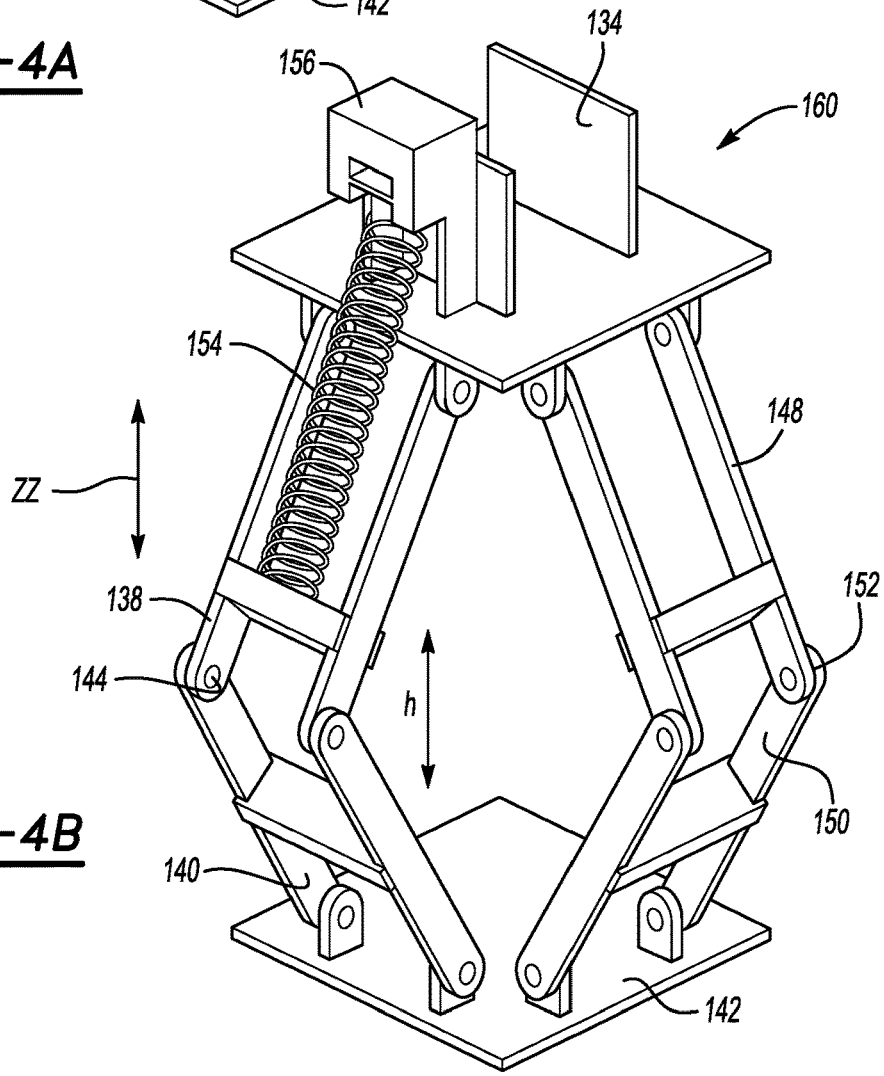

The embodiments of FIGS. 2-3B and 7 depict approaches for achieving passive compliance with one or two horizontal DOF. Additionally, FIGS. 4A-4B depict an embodiment useful for achieving a vertical DOF. An articulated compliance mechanism 160 in the form of a Sarrus linkage is shown that is capable of passively achieving a linear DOF in the Z axis. As shown in FIG. 4A, a top plate 132, e.g., a rectangular or square piece of metal or rigid plastic, includes receiving members 134 such as vertically-oriented plates configured to engage a portion of the support structure 12 of FIG. 1. The top plate 132 is also connected to a spring support 156. A first pair of links includes an upper link 138 adjustably connected to a portion of the upper plate 132 and a lower link 140 adjustably connected to a bottom plate 142. The bottom plate 142 may be configured to receive and support the end-effector 13 and load 32 of FIG. 1. Static equilibrium is thus provided along the Z axis, as represented by arrow ZZ.

Upper link 138 and lower link 140 are rotatably connected by hinge or revolute joint 144. A second set of links or plates 146 disposed adjacent the first pair of links includes an upper link 148 adjustably connected to the top plate 132 and a lower link 150 adjustably connected to the bottom plate 142. Upper link 148 and lower link 150 are connected by a hinge or revolute joint 152. A spring element 154 can be connected between the spring support 156 and a transverse beam 149 extending between the upper links 138. The spring element 154, e.g., a coil spring, pneumatic or hydraulic cinder, or other suitable structure, provides a static force with an equilibrium point at a center of range of the articulated compliance mechanism 160. The spring element 154 thus supports the load 32 and provides a mechanical restoring force, as opposed to the gravitational restoring force used as the restoring force on the horizontal axes, when the load 32 or operator force acting thereon is released.

FIG. 4B depicts the articulated compliance mechanism 160 of FIG. 4A in a vertically-extended position, i.e., extended in the vertical direction as indicated by double-headed arrow ZZ. Respective upper and lower links 138 and 140 rotate about the hinges 144, 152, causing a distance between top plate 132 and bottom plate 142 to increase or decrease based upon the circular motion of travel of the hinges 144, 152. The spring element 154 noted above cooperates with articulation of the first pair of plates 132 so as to provide a static force, with an equilibrium point at center of the vertical range of motion and reduction in stiction.

The spring support 156 may be adjustably connected to the top plate 132. A position of the spring support 156 can be adjusted relative to the top plate 132 in some embodiments so as to increase or decrease a bias of the spring element 154, thereby increasing or decreasing the static force of the spring element 154. This adaptation allows for manual or active adjustment of the static force based upon the load 32 to be applied without requiring reconfiguration of the articulated compliance mechanism 160 during operation.

Figure 5:
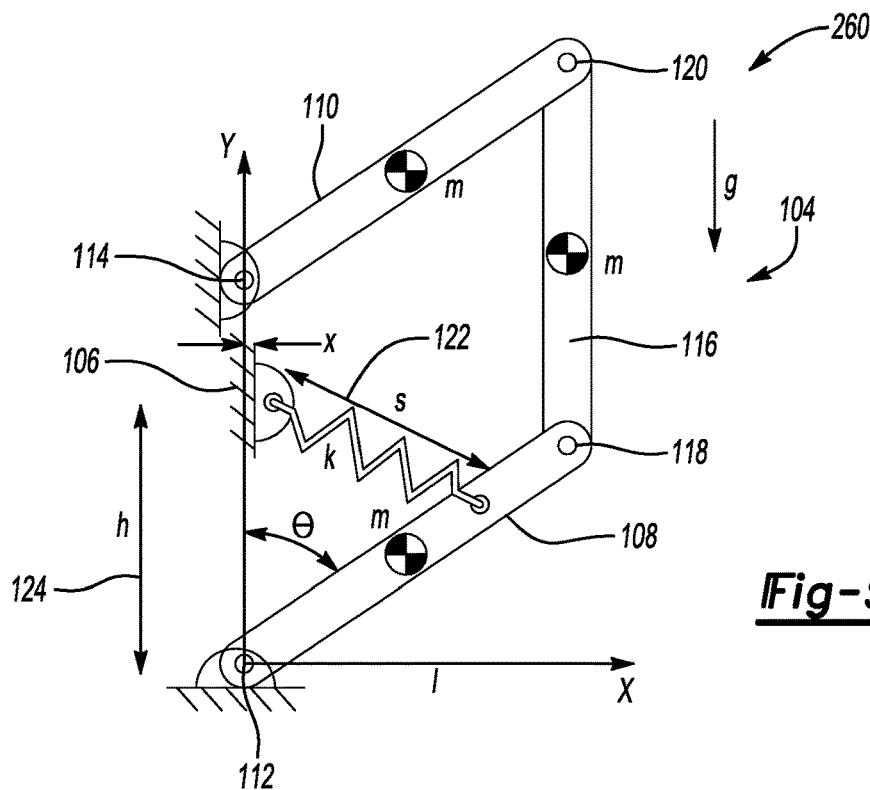
FIG. 5 is a schematic side view illustration of an articulated compliance mechanism in an alternative vertical DOF embodiment.

In FIG. 5, an alternative articulated compliance mechanism 260 is disclosed providing similar vertical compliance to that described above with reference to FIGS. 4A-B. The articulated compliance mechanism 260 may include a linkage arrangement 104 having a stationary member 106 to which opposing second and third links 108 and 110 with midpoints (m) are adjustably connected at joints 112 and 114, respectively. A fourth link 116 is connected to the second and third links 108, 110 at respective joints 118 and 120. Links 108 and 110 are mounted to the stationary member 106. In one embodiment of the disclosure, it is contemplated that the articulated compliance mechanism 260 forms a parallelogram wherein the respective links 108 and 116 are the same length.

In the illustration shown in FIG. 5, the parallelogram linkage arrangement of the articulated compliance mechanism 260 includes a spring element 122 having a variable length (s) and a stiffness (k) which is placed between and adjustably secured to the first and second links 106 and 108. The position (x, h) of an attachment point of the spring element 122 on stationary member 106 may be either manually or actively adjustable to provide different force loads. The spring element 122 creates a static force to ensure a return of links 108, 110, and 116 via gravity (g) to an equilibrium point at a center of a range of the compliance mechanism 260. Thus, an end-effector 13 as shown in FIG. 1 may be attached to link 116 and moved through an angle (θ) with respect to true vertical, thereby providing a vertical DOF to the load 32 of FIG. 1.

Spring element 122 may be implemented as any load balancer configured to apply a constant force. In different embodiments, therefore, the spring element 122 may be a coil spring or a pneumatic or hydraulic cylinder mounted between the stationary member 106 and a moving link, e.g., the links 108, 110, or 116.

Figure 6:
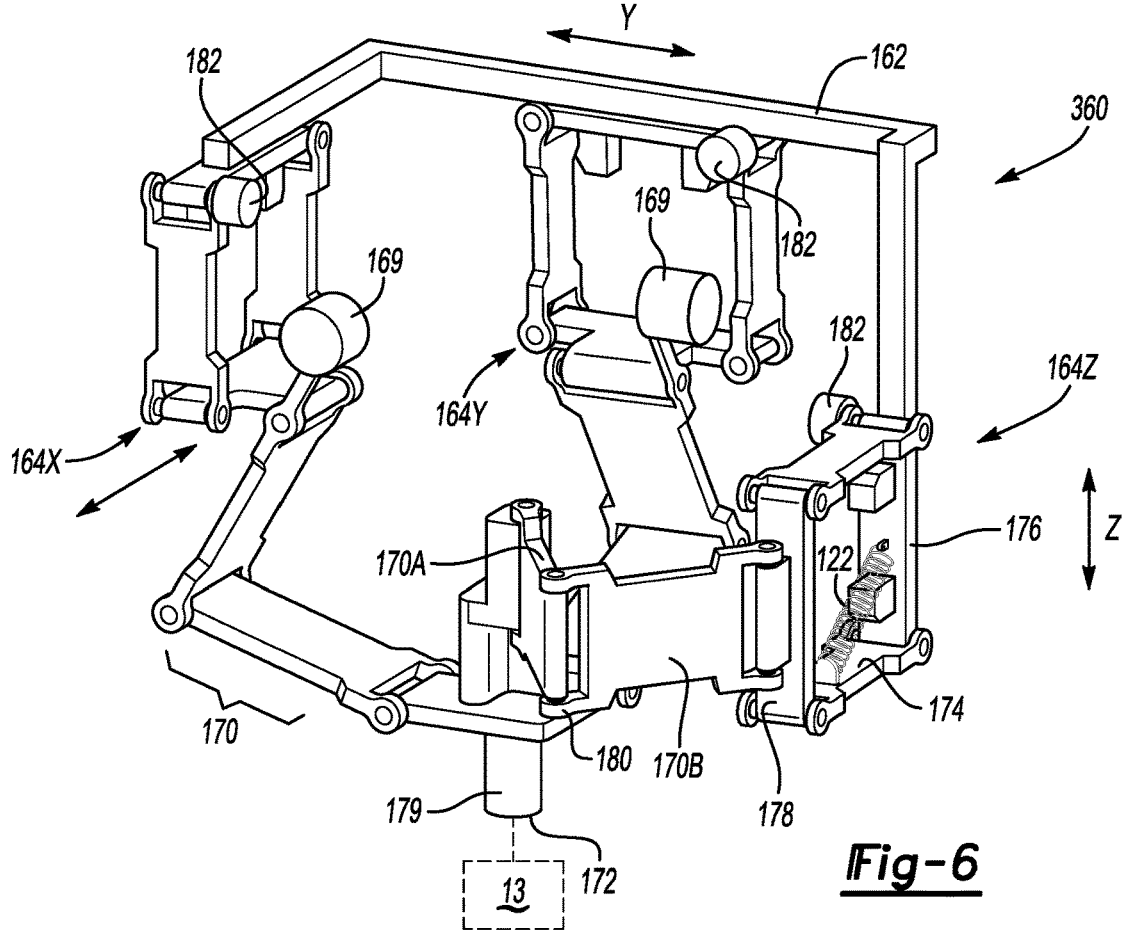
FIG. 6 is a perspective view illustration of an alternative embodiment of the articulated compliance mechanism providing three DOF translational compliance.
Figure 8:
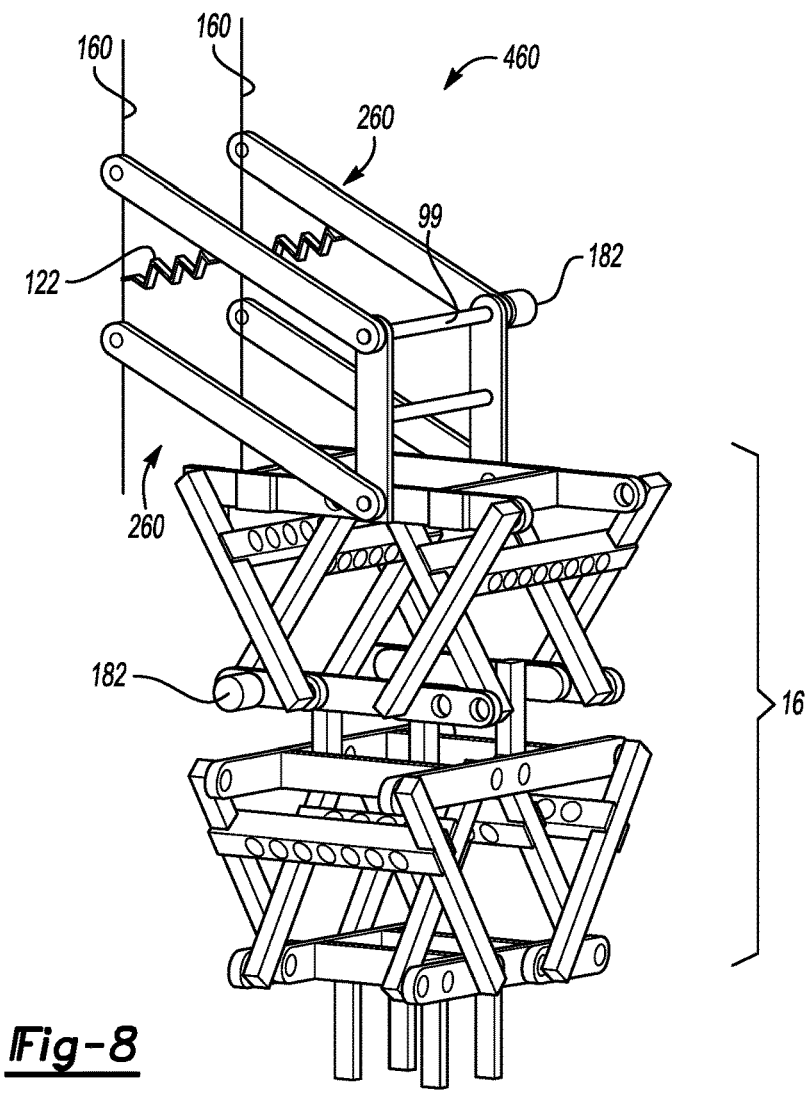
FIG. 8 is a perspective view illustration of an alternative embodiment combining the articulated compliance mechanisms of FIGS. 2 and 5 to provide translational DOF along three different axes.

FIGS. 6 and 8 depict two example embodiments for implementing two horizontal DOF and one vertical DOF within the system 11 of FIG. 1. In FIG. 6, an articulated compliance mechanism 360 accomplishes this 3-DOF compliance in one assembly, which might be desirable in certain applications, e.g., where the static load 32 is relatively light. The articulated compliance mechanism 360, which provides only passive DOF in the illustrated embodiment, includes a frame 162 that receives and supports a plurality of parallelogram arrangements 164X, 164Y, and 164Z. The parallelograms 164X, 164Y, and 164Z are configured to allow translation of the end-effector 13 of FIG. 1 along the X, Y, and Z axis, respectively. Optional counterweights 169 may be used as needed to distribute and balance the weight of a corresponding linkage. Locking devices 182 may be disposed at each of the parallelograms 164X, 164Y, and 164Z to selectively lock motion of the parallelograms 164X, 164Y, and 164Z along a given axis if so desired. Such locking devices 182 may be used with any of the joints of the depicted embodiments.

In an embodiment, each of the parallelograms 164X, 164Y, and 164Z includes parallelogram arrangements 174 each revolutely connected to the frame 162, e.g., via revolute joints as shown. A first linkage 176 of such an arrangement 174 is fixed or secured to the frame 162 and an opposing second portion 178 of equal length to the first portion 176 is adjustably connected to a hinged link assembly 170 as shown.

In operation, a connection member/carriage 179 is adjustably connected to the end-effector 13, with the carriage 179 having a function analogous to the carriage 92 described above. A link 170A has a revolute joint 180. A link 170B is also adjustably connected to the revolute joint 180 and the linkage arrangement 174 at opposing ends. Rotational movement of the linkage arrangements 174 in response to an input force from an operator is thus translated through the hinged link assembly 170 with the links 170A, 170B to effect generally linear direction of travel of the carriage 179 and, if connected, an end effector 13 disposed at an end 172 of the connection member 179. The linkage arrangement 174 may include a spring element 122 secured to the first linkage 176 or another portion of the linkage arrangement 174 and the hinged link assembly 170. As described above, such a spring element 122 may cooperate with the articulation of the linkage arrangement 174 and the hinged link assembly 170 to provide a mechanical restoring force along the Z/vertical axis, with an equilibrium point at a center of range of the articulated compliance mechanism 360, and with reduction in stiction to ensure such equilibrium is maintained along the Z axis.

FIG. 8 depicts an example articulated compliance mechanism 460 that includes the articulated compliance mechanism 16 of FIG. 2 and an additional compliance mechanism, in this instance a coupled pair of the articulated compliance mechanisms 260 of FIG. 5, thereby providing passive compliance along each of the X, Y, and Z axes. Other embodiments may be envisioned depending on the work task, for instance positioning the articulated compliance mechanism 160 of FIGS. 4A and 4B above or below the articulated compliance mechanism 16, or using only the upper compliance mechanism 36 of FIG. 2 to provide only one horizontal DOF.

The articulated compliance mechanisms 260 may be coupled to the stationary member 160 as set forth above with reference to FIG. 5. Interconnecting members 99 in the form of cross-pieces or links may be used to couple the articulated compliance mechanisms 260 to each other, with the articulated compliance mechanism 16 suspended between to the articulated compliance mechanisms 260 as shown. Although omitted from FIG. 8 for simplicity, an end-effector 13 such as a gripper having multiple fingers or suction cups may be connected to the articulated compliance mechanism 16, with the articulated compliance mechanisms 16 and 260 arranged in series to provide 3-DOF compliance, i.e., one translational DOF in a vertical direction via the two interconnected articulated compliance mechanisms 260 and a pair of orthogonally-disposed horizontal DOF provided by the articulated compliance mechanism 16. The serial configuration of FIG. 8 may also be beneficial in terms of added structural support for heavier static loads 32.

In view of this disclosure, one of ordinary skill in the art will appreciate that various embodiments are possible for providing compliant linear degrees of freedom for use in human-machine or machine-machine interactions. Attendant benefits include low stiction compared to conventional linear slides, as well as compactness in comparison to conventional parallelogram designs. The disclosed embodiments provide for self-centering of the end-effector 13, of whatever configuration is desired, without the use of springs in the horizontal/X plane.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

The invention claimed is:

1. A system comprising:
   a multi-axis robot having at least one active degree of freedom; and
   an articulated compliance mechanism configured for physical interaction with an operator when moving a static load, the articulated compliance mechanism comprising:
   a carriage having a horizontal link, wherein the carriage is configured to support or act as the static load; and
   a pair of side-by-side, adjacent first and second four-bar linkage arrangements each having a respective first, second, and fourth link, wherein the respective first, second and fourth links rotate in the same respective plane, and each of the four-bar linkage arrangements shares a third link in common, wherein for each respective one of the four-bar linkage arrangements:
the third link is rigidly connected to the multi-axis robot, such that the respective four-bar linkage arrangement is suspended from the multi-axis robot;
the first and second links cross each other, and are rotatably coupled to the third link at respective first and second revolute joints; and
the fourth link is rotatably coupled to the first link at a first end via a third revolute joint, to the second link at a second end via a fourth revolute joint, and to the horizontal link of the carriage between the first and second ends via a fifth revolute joint;
wherein none of the first, second, third, and fourth revolute joints of the first four-bar linkage arrangement shares an axis of rotation with the first, second, third, and fourth revolute joints, respectively, of the second four-bar linkage arrangement; and
wherein the system is configured to support and provide the carriage with a stable equilibrium point along a first horizontal axis using a gravitational restoring force, and to provide the carriage with a passive translational degree of freedom along the first horizontal axis in response to an input force from an operator, such that the horizontal link retains a horizontal orientation and moves in a path of travel that consists of a portion of a circular arc whose center is located above the carriage.

2. The system of claim 1, further comprising: another pair of side-by-side, adjacent four-bar linkage arrangements rotatably coupled to the first and second four-bar linkage arrangements and providing compliant movement of the carriage along a second horizontal axis.

3. The system of claim 2, further comprising:
an additional articulated compliance mechanism connected in series with the first and second four-bar linkage arrangements, and providing the carriage with a passive translational degree of freedom along a vertical axis that is orthogonal to the first and second horizontal axes.

4. The system of claim 1, further comprising:
a controller in communication with the multi-axis robot and configured to control motion of the multi-axis robot via control signals in response to a received set of input signals.

5. The system of claim 4, further comprising:
a range limit sensor in communication with the controller, wherein the controller is configured to stop or suppress operation of the multi-axis robot via the control signals in response to range limit signals from the range limit sensor.

6. The system of claim 1, further comprising:
a locking device configured to be selectively engaged to restrict or prevent motion of the articulated compliance mechanism along the first horizontal axis.

* * * * *